US011188876B1

(12) United States Patent
Gupta et al.

(10) Patent No.: US 11,188,876 B1
(45) Date of Patent: Nov. 30, 2021

(54) MATCHING METHOD OF PROVIDING PERSONALIZED RECOMMENDATIONS AND A SYSTEM THEREOF

(71) Applicant: UPWORK INC., Mountain View, CA (US)

(72) Inventors: Vivek Gupta, San Jose, CA (US); Venkata Sunil K. Yarram, Cupertino, CA (US); Pratik Bansal, Sunnyvale, CA (US); Rajasekhar L. Kovuru, Fremont, CA (US)

(73) Assignee: UPWORK INC., Mountain View, CA (US)

( * ) Notice: Subject to any disclaimer, the term of this patent is extended or adjusted under 35 U.S.C. 154(b) by 0 days.

(21) Appl. No.: 14/213,075

(22) Filed: Mar. 14, 2014

Related U.S. Application Data

(60) Provisional application No. 61/799,247, filed on Mar. 15, 2013.

(51) Int. Cl.
  *G06Q 10/10* (2012.01)
(52) U.S. Cl.
  CPC .................. *G06Q 10/1053* (2013.01)
(58) Field of Classification Search
  None
  See application file for complete search history.

(56) References Cited

U.S. PATENT DOCUMENTS

| | | | |
|---|---|---|---|
| 6,092,049 A | 7/2000 | Chislenko | |
| 6,208,659 B1 | 3/2001 | Govindarajan et al. | |
| 6,385,620 B1 * | 5/2002 | Kurzius | G06Q 10/10 |
| 6,591,011 B1 | 7/2003 | Nielsen | |
| 6,618,734 B1 | 9/2003 | Williams | |
| 6,662,194 B1 * | 12/2003 | Joao | G06Q 10/10 705/1.1 |
| 6,735,570 B1 | 5/2004 | Lacy et al. | |
| 6,859,523 B1 | 2/2005 | Jilk | |

(Continued)

OTHER PUBLICATIONS

Mang, Online Search and Matching Quality, 2012, Leibinz Institute for Economic Research at the University of Munich, 147, 1-18. (Year: 2012).*

(Continued)

*Primary Examiner* — Rutao Wu
*Assistant Examiner* — Zahra Elkassabgi
(74) *Attorney, Agent, or Firm* — Haverstock & Owens LLP

(57) ABSTRACT

Embodiments of the present invention relate to real-time matching. As changes in data occur in a system, these changes are immediately used by running models implemented in the system to provide users with real-time personalized results. Concurrently, the system is continuously learning from these same changes to build test models, which are built upon the running models (which reflect past knowledge) using the current knowledge. The running models are continuously evolving as they are updated with the test models. A model implemented by the system is a match model, which is configured to intelligently determine which members are available for a new job and to provide a user with at least one member from that pool of available members who satisfies a search criteria specified by the user. The user's actions and the available member's actions are both immediately captured, analyzed and reflected in the system.

19 Claims, 4 Drawing Sheets

(56) References Cited

U.S. PATENT DOCUMENTS

| | | | |
|---|---|---|---|
| 6,871,181 B2 | 3/2005 | Kansal | |
| 6,931,385 B1 | 8/2005 | Halstead et al. | |
| 7,096,193 B1 | 8/2006 | Beaudoin | |
| 7,466,810 B1 | 12/2008 | Quon | |
| 7,505,919 B2* | 3/2009 | Richardson | G06Q 10/06 705/321 |
| 7,752,080 B1 | 7/2010 | Greener | |
| 7,814,085 B1 | 10/2010 | Pfleger | |
| 8,024,670 B1 | 9/2011 | Rahmatian | |
| 8,156,051 B1 | 4/2012 | Shah | |
| 8,224,755 B2 | 7/2012 | Goodman et al. | |
| 8,380,709 B1 | 2/2013 | Diller | |
| 8,504,403 B2 | 8/2013 | Deich | |
| 8,512,143 B2 | 8/2013 | Jung et al. | |
| 8,517,742 B1 | 8/2013 | Johnson | |
| 8,682,683 B2 | 3/2014 | Ananian | |
| 8,843,388 B1 | 9/2014 | Westfall | |
| 8,856,670 B1* | 10/2014 | Thakur | G06F 9/4443 715/747 |
| 9,454,576 B1 | 9/2016 | Kapoor | |
| 2001/0034630 A1* | 10/2001 | Mayer | G06Q 10/063112 705/7.14 |
| 2001/0034688 A1 | 10/2001 | Annunziata | |
| 2001/0039508 A1 | 11/2001 | Nagler | |
| 2001/0041988 A1 | 11/2001 | Lin | |
| 2002/0010685 A1 | 1/2002 | Ashby | |
| 2002/0052773 A1 | 5/2002 | Kraemer | |
| 2002/0054138 A1 | 5/2002 | Hennum | |
| 2002/0103687 A1 | 8/2002 | Kipling | |
| 2002/0120554 A1 | 8/2002 | Vega | |
| 2002/0161707 A1 | 10/2002 | Cole et al. | |
| 2003/0004738 A1 | 1/2003 | Chander | |
| 2003/0014294 A1 | 1/2003 | Yoneyama | |
| 2003/0050811 A1 | 3/2003 | Freeman, Jr. | |
| 2003/0086608 A1 | 5/2003 | Frost | |
| 2003/0097305 A1 | 5/2003 | Ogino et al. | |
| 2003/0191684 A1 | 10/2003 | Lumsden | |
| 2003/0212246 A1 | 11/2003 | Eleveld | |
| 2003/0212627 A1 | 11/2003 | Burns et al. | |
| 2003/0220843 A1 | 11/2003 | Lam | |
| 2004/0064436 A1 | 4/2004 | Breslin et al. | |
| 2004/0103167 A1* | 5/2004 | Grooters | G06F 9/546 709/217 |
| 2004/0128224 A1 | 7/2004 | Dabney et al. | |
| 2004/0215560 A1 | 10/2004 | Amalraj et al. | |
| 2004/0230511 A1 | 11/2004 | Kannan et al. | |
| 2004/0243428 A1 | 12/2004 | Black | |
| 2005/0033633 A1 | 2/2005 | LaPasta | |
| 2005/0043998 A1 | 2/2005 | Bross | |
| 2005/0222907 A1 | 10/2005 | Pupo | |
| 2006/0031177 A1 | 2/2006 | Rule | |
| 2006/0080116 A1 | 4/2006 | Maguire | |
| 2006/0143228 A1 | 6/2006 | Odio-Paez | |
| 2006/0159109 A1 | 7/2006 | Lamkin | |
| 2006/0173724 A1* | 8/2006 | Trefler | G06Q 10/063112 705/7.14 |
| 2006/0195428 A1 | 8/2006 | Peckover | |
| 2006/0212359 A1 | 9/2006 | Hudgeon | |
| 2006/0284838 A1 | 12/2006 | Tsatalos | |
| 2007/0022040 A1 | 1/2007 | Gordon | |
| 2007/0061144 A1* | 3/2007 | Grichnik | G05B 17/02 704/256.8 |
| 2007/0112671 A1 | 5/2007 | Rowan | |
| 2007/0130059 A1 | 6/2007 | Lee et al. | |
| 2007/0174180 A1 | 7/2007 | Shin | |
| 2007/0192130 A1 | 8/2007 | Sandhu | |
| 2007/0233510 A1 | 10/2007 | Howes | |
| 2008/0059267 A1 | 3/2008 | Hamilton | |
| 2008/0059523 A1 | 3/2008 | Schmidt | |
| 2008/0134292 A1 | 6/2008 | Ariel et al. | |
| 2008/0154783 A1 | 6/2008 | Rule | |
| 2008/0194228 A1 | 8/2008 | Pousti | |
| 2008/0288582 A1 | 11/2008 | Pousti | |
| 2008/0313005 A1 | 12/2008 | Nessland | |
| 2009/0011395 A1 | 1/2009 | Schmidt | |
| 2009/0055404 A1 | 2/2009 | Heiden | |
| 2009/0055476 A1 | 2/2009 | Marcus et al. | |
| 2009/0132345 A1 | 5/2009 | Meyssami et al. | |
| 2009/0150386 A1 | 6/2009 | Lichtblau | |
| 2009/0210282 A1 | 8/2009 | Elenbaas et al. | |
| 2009/0241035 A1 | 9/2009 | Tseng et al. | |
| 2009/0265243 A1 | 10/2009 | Karrassner | |
| 2009/0288021 A1 | 11/2009 | Ioffe | |
| 2010/0017253 A1 | 1/2010 | Butler | |
| 2010/0144318 A1 | 6/2010 | Cable | |
| 2010/0161503 A1 | 6/2010 | Foster | |
| 2010/0162167 A1 | 6/2010 | Stallings | |
| 2010/0287525 A1 | 11/2010 | Wagner | |
| 2011/0106762 A1* | 5/2011 | Dane | G06F 21/6227 707/636 |
| 2011/0208665 A1 | 8/2011 | Hirsch | |
| 2011/0302053 A1 | 12/2011 | Rigole | |
| 2012/0143952 A1 | 6/2012 | Von Graf | |
| 2012/0150761 A1 | 6/2012 | Ananian | |
| 2012/0265770 A1* | 10/2012 | Desjardins | G06Q 10/06 707/748 |
| 2012/0290365 A1* | 11/2012 | Bramlett, Jr. | G06Q 10/1053 705/7.42 |
| 2013/0325734 A1* | 12/2013 | Bixler | G06Q 10/1053 705/321 |
| 2014/0164271 A1* | 6/2014 | Forman | G06Q 10/1053 705/321 |
| 2014/0377723 A1 | 12/2014 | Strong | |

OTHER PUBLICATIONS

Paolucci et al., "Semantic Matching of Web Services Capabilities", 2002, Carnegie Mellon University, Pittsburgh, PA, USA.

D'Aurizio, Patricia. "Human Resource Solutions Onboarding: Delivering the Promise". Nursing Economics 25.4 (2007):228, year 2007.

Graybill, Jolie O., et al., "Employee Onboarding: Identification of Best Practices in ACRL Libraries", Library Management 34.3, (2013), 200-218. (Year: 2013).

IBM Websphere Telecommunications Web Services Server Programming Guide, ibm.com/redbooks, John Bergland et al., Sep. 2008.

Muhl, Charles J. "What Is an Employee—The Answer Depends on the Federal Law." Monthly Lab. Rev. 125(2002): 9 pages.

Barton, Lisa Horwedel "Reconciling the independent contractor versus employee dilemma: a discussion of current developments as they relate to employee benefit plans." Cap. UL Rev 29 (2001): 63 pages.

Moran, Jenna Amato "Independent Contractor or Employee-Misclassification of Workers and Its Effect of the State." Buff. Pub. Int. LJ 28 (2009): 28 pages.

Webb, Teresa J., et al. "An empirical assist in resolving the classification dilemma of workers as either employees or independent contractors." Journal of Applied Business Research (JABR) 24. (2011): 22 pages.

Wood, Robert W. "Defining Employees and Independent Contractors." Bus. L. Today 17 (2007): 6 pages.

* cited by examiner

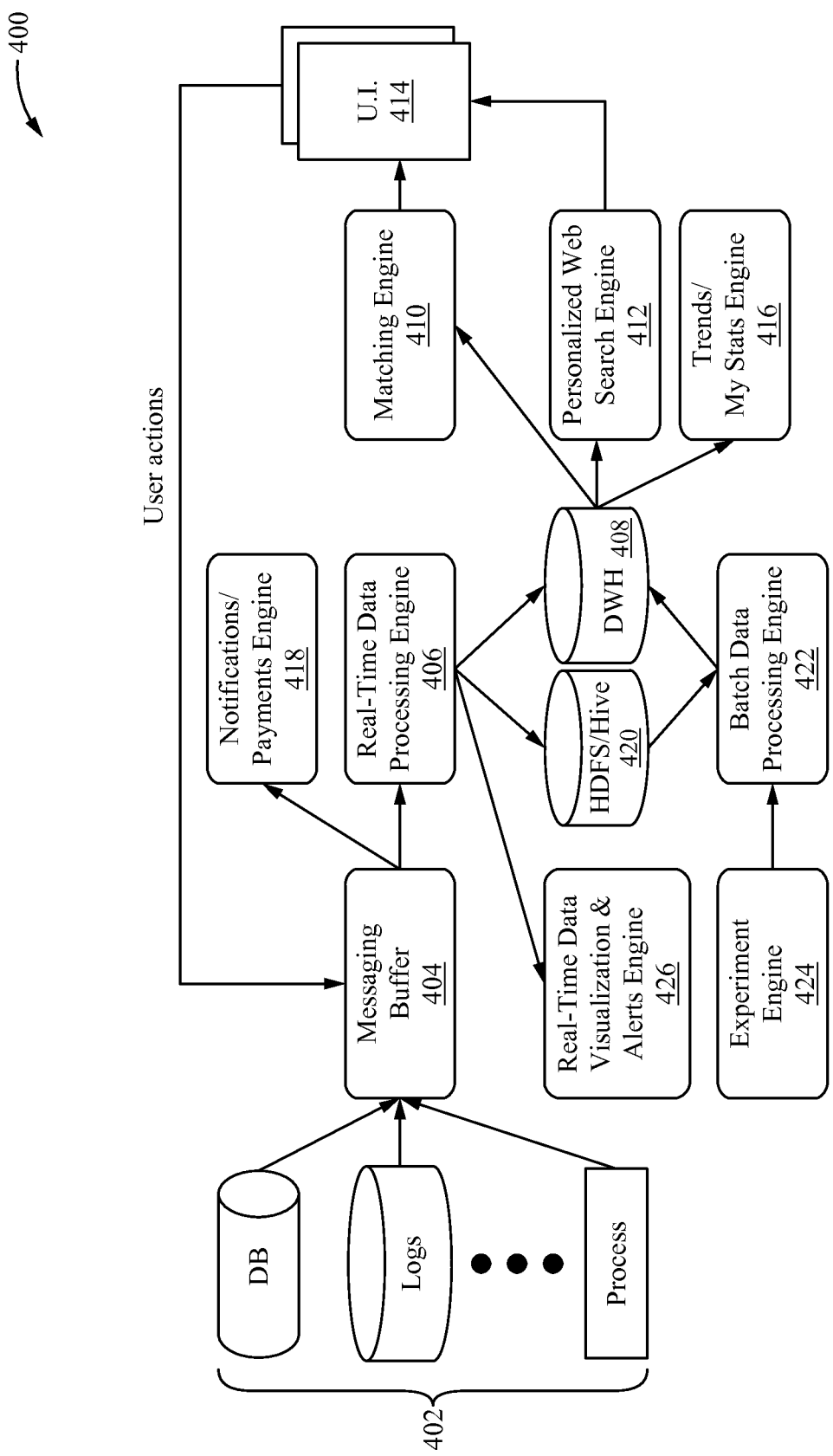

MATCHING METHOD OF PROVIDING PERSONALIZED RECOMMENDATIONS AND A SYSTEM THEREOF

CROSS REFERENCE TO RELATED APPLICATIONS

The application claims priority of U.S. provisional application, Ser. No. 61/799,247, filed Mar. 15, 2013, and entitled "Instamatch Engine," by the same inventors. This application incorporates U.S. provisional application, Ser. No. 61/799,247, in its entirety by reference.

FIELD OF INVENTION

The present invention relates to an improved method of matching and a system thereof, wherein the matching provides personalized recommendations.

BACKGROUND OF THE INVENTION

Prior art matching systems involve collecting data in static data containers and processing the collected data at predetermined intervals to update matching algorithms implemented in the prior art matching systems. The prior art matching systems do not immediately process changes as they occur in the system as these changes, which become part of the collected data, are only periodically processed such as once a day or once a week. Accordingly, a drawback of the prior art matching systems is that data, such as user actions, are not immediately captured, analyzed and reflected, to provide users with the most relevant results.

BRIEF SUMMARY OF THE INVENTION

Embodiments of the present invention relate to real-time matching. As changes in data occur in a system, these changes are immediately used by running models implemented in the system to provide users with real-time personalized results. Concurrently, the system is continuously learning from these same changes to build test models, which are built upon the running models (which reflect past knowledge) using the current knowledge. The running models are continuously evolving as they are updated with the test models. A model implemented by the system is a match model, which is configured to intelligently determine which members are available for a new job and to provide a user with at least one member from that pool of available members who satisfies a search criteria specified by the user. The user's actions and the available member's actions are both immediately captured, analyzed and reflected in the system.

In one aspect, a non-transitory computer-readable medium is provided. The non-transitory computer-readable medium stores instructions that, when executed by a computing device, cause the computing device to perform a method. The method includes determining availability of each member within a services exchange medium based on user behaviors of all members continuously collected within the services exchange medium. The user behaviors include accepting a job, declining a plurality of invitations, not responding to proposals, not logging into the services exchange medium for a predetermined amount of time, and searching for work. Other user behaviors are contemplated. In some embodiments, the availability of each member is dependent of a type of job the member has accepted. For example, it can be determined that a first member who has accepted a job, such as a 40-hour programming job, is unavailable for more jobs, while it can be determined that a second member who has accepted a job, such as a 4-hour logo design job, is available for more jobs.

The method also includes providing a pool of available members. Each of the available members of the pool are selected from all members of the services exchange medium based on the learned availability.

The method also includes receiving search criteria input by a user. The search criteria is skills, location, rate, feedback and/or other suitable search criteria.

The method also includes using the search criteria as filters to present to the user at least one of the available members who satisfies the search criteria.

In some embodiments, the method further includes collecting a response from the user, wherein the response becomes part of the collection from which availability is learned.

In another aspect, a system for providing real-time personalization is provided. The system includes a first online loop. The first online loop includes a messaging buffer that contains messages. The message are received at the messaging buffer from at least one of databases, logs, processes and a user interface.

The first online loop also includes a real-time data processing engine that includes a plurality of processors for parallel processing of a message received from the messaging buffer. Each of the plurality of processors is typically configured to process a portion of the message.

The first online loop also includes a data warehouse that stores data processed by the real-time data processing engine.

The first online loop also includes a matching engine that implements a match model configured to intelligently provide a user with at least one available member. The at least one available member typically satisfies a search criteria specified by the user.

In some embodiments, the match model is also configured to learn availability based on user behaviors of all members continuously collected within a services exchange medium, provide a pool of available members, wherein each of the available members of the pool are selected from all members of the services exchange medium based on the learned availability, and select the at least one available member from the pool.

The first online loop also includes the user interface that displays results. The results includes the at least one available member. User actions associated with the user interface are typically received by the messaging buffer for further processing by the real-time data processing engine. The user interface can be in a form of a web page, an email, a popup message or a device application (e.g., mobile application, TV application).

In some embodiments, the system also includes an additional online loop, which includes the messaging buffer, the real-time data processing engine, the data warehouse, a personalized web search engine and the user interface. The personalized web search engine typically implements a search model that is configured to intelligently return web search results that are based on the user's behavior within the services exchange medium. The results typically includes the web search results.

In some embodiments, the system also includes a trends/my stats engine that is configured to personalize the user interface, a real-time data visualization and alerts engine that is configured to provide information regarding data flow through the system, and/or a notifications/payments engine that is configured to provide the user with information regarding changes to the system.

In some embodiments, the system also includes HDFS/Hive that stores the same data processed by the real-time data processing engine that is also in the data warehouse. The data in the HDFS/Hive is referred to as training data. The system also includes an experiment engine including one or more test models. The experiment engine can track performance of any of the one or more test models and provides performance data of that test model. The one or more test models are refined prior to being implemented by one or more engines of the system. For example, in some embodiments, the match model was processed by the batch data processing engine prior to the match engine implementing the match model. The system also includes a batch data processing engine that processes the one or more test models using the training data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 illustrates an exemplary system for providing real-time matches according to an embodiment of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention relate to real-time matching. As changes in data occur in a system, these changes are immediately used by running models implemented in the system to provide users with real-time personalized results. Concurrently, the system is continuously learning from these same changes to build test models, which are built upon the running models (which reflect past knowledge) using the current knowledge. The running models are continuously evolving as they are updated with the test models. A model implemented by the system is a match model, which is configured to intelligently determine which members are available for a new job and to provide a user with at least one member from that pool of available members who satisfies a search criteria specified by the user. The user's actions and the available member's actions are both immediately captured, analyzed and reflected in the system.

Figure 1:
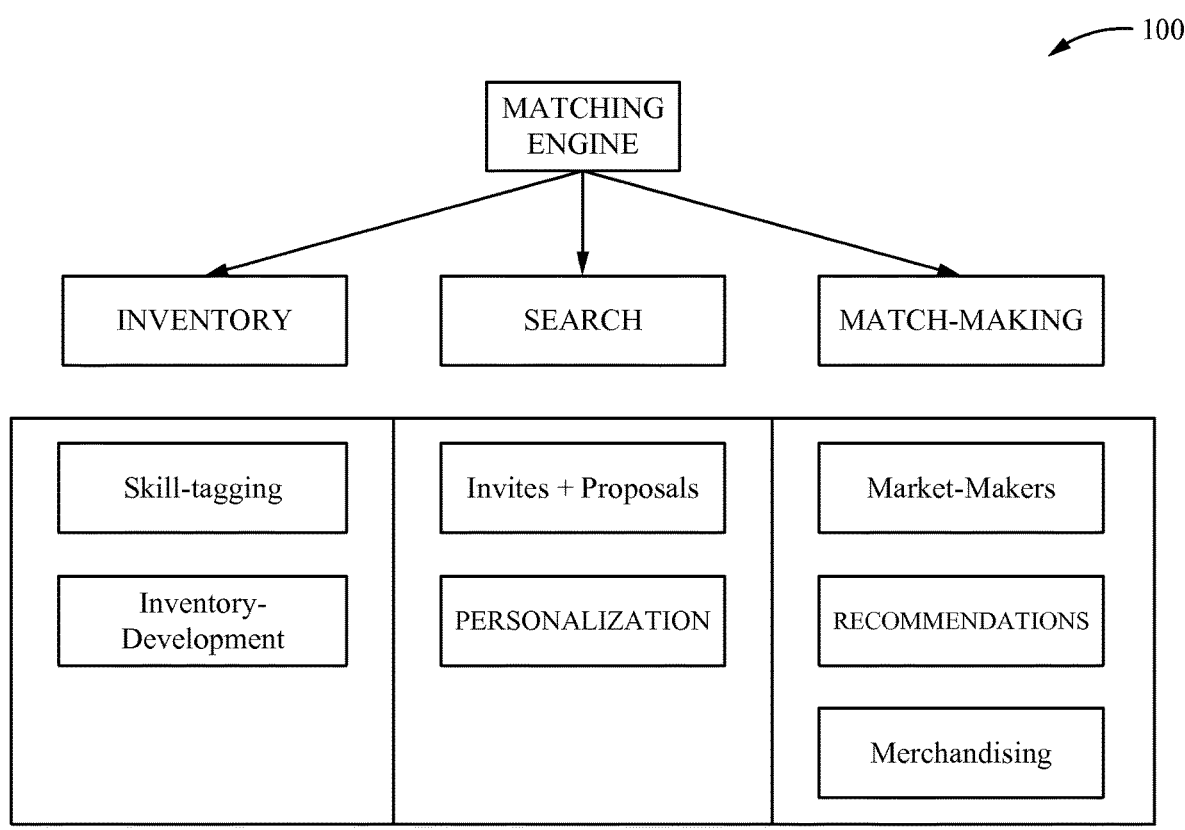
FIG. 1 illustrates building blocks of an exemplary matching engine according to an embodiment of the present invention.

In some embodiments, the match model is implemented by a matching engine of the system. FIG. 1 illustrates building blocks of an exemplary matching engine 100 according to an embodiment of the present invention. The matching engine includes three main building blocks. The three main building blocks are Inventory, Search and Match Making. The Inventory building block includes concepts involving (1) skill tagging and (2) inventory development. The Search building block includes concepts involving (1) invites and proposals and (2) personalization. The Match Making building block includes concepts involving (1) market movers, (2) recommendations and (3) purchasing. Details of the personalization concept and recommendations concept are discussed in detail below, although the remaining concepts are not discussed herein.

The personalization concept and the recommendations concept address matching issues in a services exchange medium. The services exchange medium is for hiring and working on demand. In the services exchange medium, clients are able to find and hire freelancers to get projects done quickly and cost effectively. Specifically, freelancers profiles are maintained in the services exchange medium and can be obtained and reviewed by clients prior to hiring. Similarly, in the services exchange medium, freelancers are able to search for projects posted by clients to work on. Freelancers can be invited by clients to bid on the projects posted by clients. Based on the logic of the match model, the matching engine is configured to assist in recommending appropriate jobs and/or clients to freelancers. Similarly, based on the logic of the match model, the matching engine is configured to assist in recommending proposals and/or qualified freelancers to clients. It should be noted that the terms work, jobs and projects are used interchangeably herein. Typically, all clients and all freelancers are members of the services exchange medium.

Figure 2:
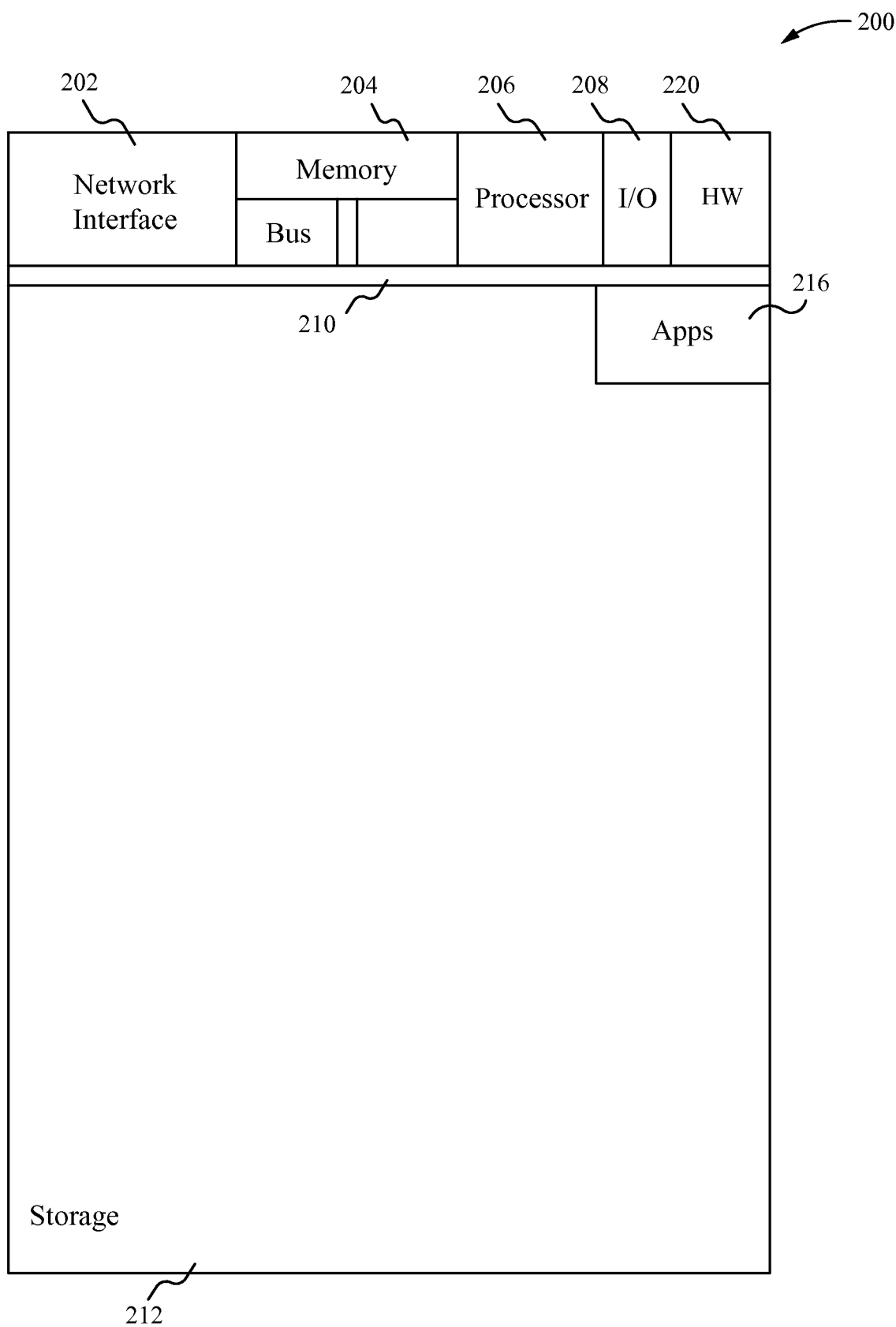
FIG. 2 illustrates a block diagram of an exemplary computing device according to an embodiment of the present invention.

The matching engine 100 is typically implemented on a computing device, such as a server. FIG. 2 illustrates a block diagram of an exemplary computing device 200 according to an embodiment of the present invention. The computing device 200 is able to be used to acquire, cache, store, compute, search, transfer, communicate and/or display information.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 214, such as a program(s) implementing the match model, are likely to be stored in the storage device 212 and memory 204 and are processed by the processor 206. More or less components shown in FIG. 2 are able to be included in the computing device 200.

Figure 3:
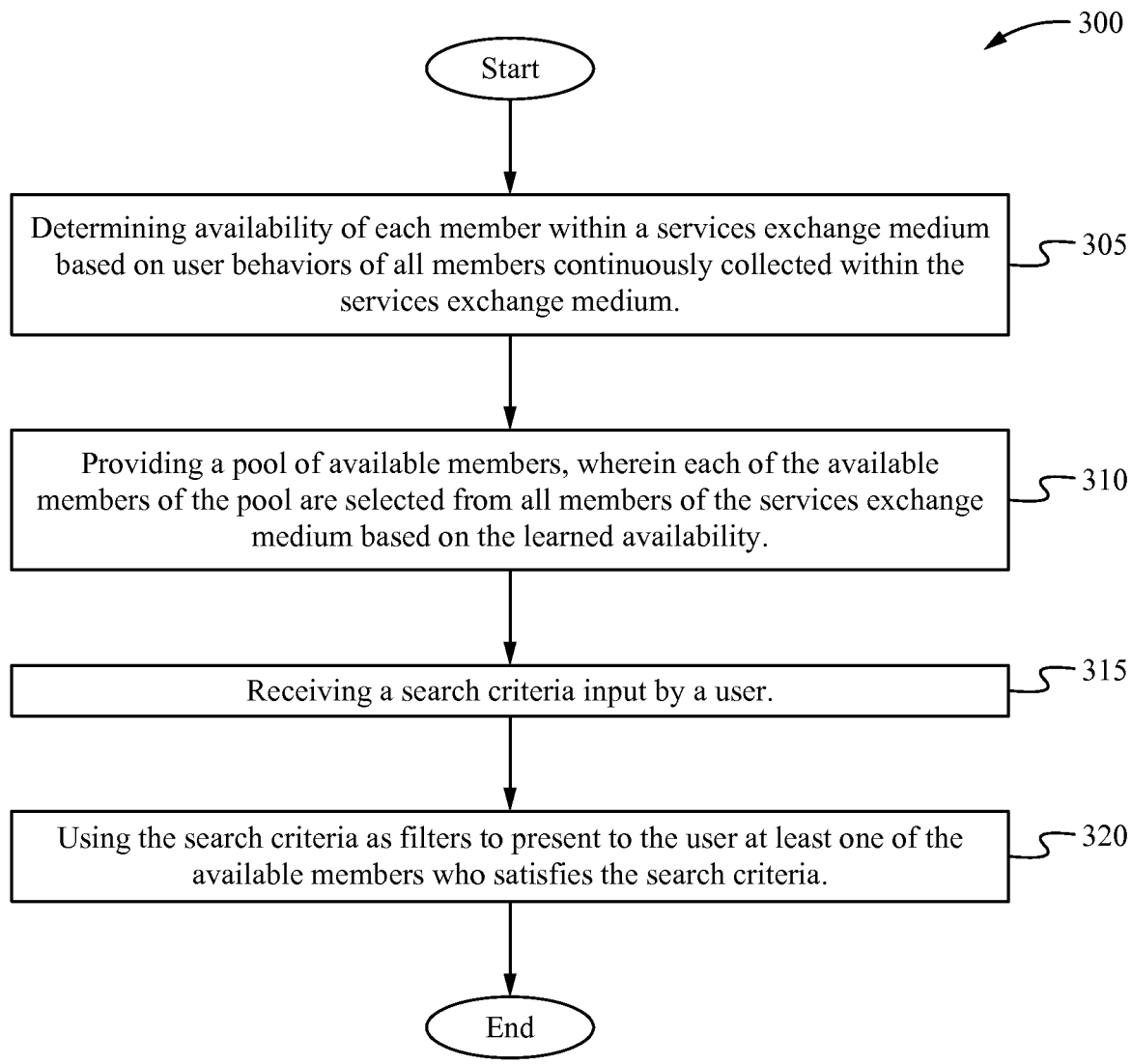
FIG. 3 illustrates an exemplary method of providing real-time matches according to an embodiment of the present invention

FIG. 3 illustrates an exemplary method 300 of providing real-time matches according to an embodiment of the present invention. The method 300 is typically implemented by the matching engine 100 of FIG. 1. The method 300 begins at a step 305. At the step 305, the matching engine 100 determines availability of each member within the services exchange medium. The determination is based on user behaviors of all members that are continuously collected within the services exchange medium. The following are exemplary circumstances in which a freelancer is determined to be unavailable for a new or additional work:

rejecting X consecutive invites in Y amount of time (e.g., minutes, hours, days, weeks, etc.);

previously accepting a long-term job, such as a 40-hour web programming job accepting a plurality of short-term jobs;

not being logged into the services exchange medium for Z amount of time (e.g., weeks, months, etc.);

providing a reason of unavailability in a previous invite; and marking the unavailability status in the profile.

The following are exemplary circumstances in which a freelancer is determined to be available for a new or additional work:

previously accepting one or two short-term jobs, such as two 4-hour logo design jobs;

completion of a job;

logging into the services exchange medium after being dormant;

searching for jobs on search pages; and marking the availability status in the profile.

It should be understood that these circumstances are only exemplary and are not limited to those listed. The intelligence of the system is adaptive. The system continuously learns from user behaviors to improve its intelligence in determining other circumstances in which a freelancer is available or unavailable.

At a step 310, the matching engine 100 provides a pool of available members. In particular, those members who have been determined as being available for new or additional work become part of the pool. And, those members who have been determined as being unavailable for new or additional work do not become part of the pool. Each of the available members of the pool is selected from all members of the services exchange medium based on the determination made at the previous step 305.

At a step 315, the matching engine 100 receives a search criteria input from a user. For example, the user is a client who is searching for qualified freelancers. The client is typically able to input one or more search criteria such as skills, location, rate, and feedback during a search. Other search criteria are possible.

At a step 320, the matching engine 100 uses the search criteria as filters to present to the user at least one of the available members who satisfies the search criteria. In some embodiments, all available members who satisfy the user's search criteria are provided to the user. Alternatively, only the top M available members who best satisfy the user's search criteria are provided to the user. In some embodiments, these recommended members are sorted based on a rank score.

For example, assume only freelancers Ann, May, James, Riki and Thomas are part of the pool as they have been determined to be available for new or additional work at the steps 305 and 310. All other freelancers within the services exchange medium have been determined to be unavailable for new or additional work. Further assume client Wendy is searching to hire a service provider who knows web programming and lives in Sacramento. Freelancer Ann will be returned to the user since Ann best satisfies Wendy's search criteria. May, James, Riki and Thomas are not recommended not because they were not in the pool but because they do not meet the search criteria.

At the end of the step 320, the method 300 ends.

Typically, responses, such as user actions in the user interface 414, from the user, the at least one member presented to the user, or both are collected. The responses become part of the collection from which availability is learned. The system is thus able to reflect changes, including the responses, immediately in the match model, typically within seconds, to provide users with personalized recommendations.

In contrast, prior art matching engines are not intelligent and is not able to differentiate between those members who are available and those members who are unavailable for new or additional work. As such, the prior art matching engines blindly includes everyone in the pool. A user's search criteria is then applied to everyone in the pool. It is therefore possible for the prior art matching engines to recommend a freelancer who is unavailable for new or additional work to a user. Continuing with the example, prior art matching engines could recommend both freelancers Greg and Ann because both meet the user's search criteria, even though Greg is currently unavailable to accept new or additional work.

Although the matching engine 410 has been discussed as recommending freelancers, the matching engine 410 can also provide other personalized recommendations, including clients, jobs and proposals.

FIG. 4 illustrates an exemplary system 400 for providing real-time personalization according to an embodiment of the present invention. Briefly, the system 400 is able to process each change as the change occurs in the system 400 and to determine how the change maps to models implemented by the system 400. Components of the system 400 includes a plurality of sources 402, a messaging buffer 404, a real-time data processing engine 406, a data warehouse 408, a matching engine 410, a personalization web search engine 412, one or more forms of user interface 414 (simply referred to as user interface), a HDFS/Hive 420, a batch data processing engine 422, an experiment engine 424, and a real-time data visualization and alerts engine 426. More or less components are possible. For example, the system 400 can also include a notifications/payments engine 418 and/or a trends/my stats engine 416, which are extensions of the system 400. The learning described above is a process typically supported by the system 400.

The system 400 can support front-end services for end users of the system 400. The front-end services include a first online loop. The first online loop is configured to provide real-time matches discussed in FIG. 3. The first online loop includes the messaging buffer 404, the real-time data processing engine 406, the data warehouse 408, the matching engine 410 and the user interface 414.

The messaging buffer 404, such as a FIFO buffer or any suitable queue, contains messages. The messages are changes that occur in the system 400. The changes can be received from the plurality of sources 402, such as database (s), log(s) and process(es). Other sources are contemplated. The changes can also be received from the user interface 414.

Each message in the messaging buffer 404 is received at and processed by the real-time data processing engine 406. The real-time data processing engine 406 includes a plurality of processors for parallel processing a message received from the messaging buffer 404. Each of the plurality of processors is configured to process a particular portion of the message such that the entire message is processed by the real-time data processing engine 406. Each of the plurality of processors is responsible for performing a set of analysis on its assigned portion of the message to analyze. The real-time data processing engine 406 preferably is able to process volumes of activity or changes in real-time and scale.

Data processed by the real-time data processing engine 406 is stored at (e.g., written into) the data warehouse 408. The matching engine 410, which implements the match model described above, receives a search criteria specified by the user and, using the data from the data warehouse 408, to recommend/provide at least one available member who satisfies the search criteria. In particular, the match model includes logic configured to determine availability of each member based on user behaviors of all members continuously collected with the services exchange medium, to provide a pool of available members based on the determination, and to use the search criteria as filters to present or recommend the at least one available member from the pool. The recommended member is not only qualified to do or perform the work but is available to take on the work.

The user interface 414 displays results, such as the at least one available member recommended by the matching engine 410. The user interface 414 can be in the form of a web page, an email or a popup message. Other forms of the user interface 414, such as device applications including a mobile application and a TV application, are contemplated. Typically, user actions associated with the user interface 414 are received by the messaging buffer 404 for further immediate processing by the real-time data processing engine 406. Any actions associated with the user interface 414 are reflected in the data warehouse 408 to be used by the messaging engine 410. For example, new user registration, new job posts, and changes to data are considered in real-time. If Ann, from the above hypothetical, changes location, then matches will not show Ann for that search location, Sacramento.

In some embodiments, the front-end services also include a second online loop. The second online loop is configured to provide personalized web searches. The second online loop includes the messaging buffer 404, the real-time data processing engine 406, the data warehouse 408, the personalized web search engine 412 and the user interface 414. The same data in the data warehouse 408 used by the matching engine 410 is also used by the personalized web search engine 412. The personalized web search engine 412 implements a search model. The search model includes logic that is configured to intelligently return web search results that are based on the user's behavior within the services exchange medium. The web search results are displayed at the user interface 414. The personalized web search engine 412 is typically able to log users in and out and maintain sessions.

In some embodiments, the front-end services also include the trends/my stats engine 416 that is configured to personalize the user interface 414 by presenting to the user personalized data, including the user's trends and statistics (e.g., quality of the user) in the services exchange medium. The personalized data is typically derived from the data stored in the data warehouse 408. The trends/my state engine 416 is an extension of the system 400.

In some embodiments, the front-end services also include the notifications/payments engine 418 that is configured to provide the user with information regarding changes to the system 400 and payments. The notifications/payments engine 418 is also an extension of the system 400.

The system 400 can also support back-end services for administrators of the system 400. In some embodiments, the back-end services include the real-time data visualization and alerts engine 426 that is configured to provide to administrators information regarding data flow through the system 400.

In some embodiments, the back-end services also include the HDFS/Hive 420, the batch data processing engine 422 and the experiment engine 424. The HDFS/Hive 420 stores the same data processed by the real-time data processing engine 406 that is also stored in the data warehouse 408. In some embodiments, data from the real-time data processing engine 406 is concurrently rewritten to both the HDFS/Hive 420 and the data warehouse 408. The data in the HDFS/Hive 420 is referred to as training data.

The experiment engine 424 includes one or more test models in development. The training data in the HDFS/Hive 420 is typically processed by the batch data processing engine 422 using the one or more test models stored in the experiment engine 424 to create current knowledge. The test models are typically built upon running models (e.g., match model and search model) and the current knowledge. In some embodiments, two or more test models can be simultaneously processed. Developers are able to further refine the test models in the batch data processing engine 422 before the test models are implemented in the different engines of the system 400. For example, in some embodiments, the match model was processed (e.g., tested) by the batch data processing engine 422 prior to the match engine 410 implementing the match model. For another example, in some embodiments, the search model was processed (e.g., tested) by the batch data processing engine 422 prior to the personalized web search engine 412 implementing the search model. Refinement of each test model is an iterative process.

In some embodiments, the experiment engine 424 is also configured to track performance of any test model in the system 400. The system 400 is configured to provide performance data of the test model being tracked. Developers are able to evaluate the performance data to optimize that test model by adjusting parameters of that test model in the experiment engine 424. In some embodiments, the performance data is typically available within hours of testing.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method of optimizing performance in a services exchange medium, the method comprising:

accessing an evolving collection of explicit and implicit user behaviors of all members in at least one user interface associated with the services exchange medium and continuously collected within the services exchange medium to establish availability knowledge;

processing messages in an online loop that includes a real-time data processing engine, the real-time data processing engine comprising a plurality of processors and a matching engine, each of the plurality of processors for parallel processing of a portion of a message received from a messaging buffer, the messaging buffer comprising a queue containing messages associated with real-time changes in the services exchange medium;

executing the matching engine comprising:
running a dynamic match model for determining, according to the availability knowledge, availability of each member within the services exchange medium based on a respective member's behaviors within the services exchange medium, wherein an availability of a member is updated based on a behavior of the member related to one or more prior jobs;

forming a dynamic subset of members, wherein the dynamic subset includes available members selected from all members of the services exchange medium based on the determining availability;

after forming the dynamic subset of members, receiving search criteria input by a user;

using the search criteria as filters to search against a set containing the dynamic subset of members and excluding unavailable members of the services exchange medium to determine at least one of the available members from the dynamic subset of members who satisfies the search criteria; and automatically updating the match model, comprising:
determining a first set of circumstances in which a member is available or unavailable for a job;
using the user behaviors to determine a second set of circumstances in which a member is available or unavailable for a job, the second set of circumstances different from the first set of circumstances;
updating the first set of circumstances to include the second set of circumstances; and
updating the match model based on the first set of circumstances; and presenting to the user the at least one of the available members; and on an ongoing basis, obtaining new explicit and implicit user behaviors in the at least one user interface associated with the services exchange medium to be processed in real-time and, thereafter, added to the evolving collection to improve the availability knowledge to determine circumstances in which a member is available or unavailable for a job, and to thereby provide more relevant results based on the continuously obtained explicit and implicit user behaviors, wherein the user behaviors include accepting a job, declining a plurality of invitations, not responding to proposals, not logging into the services exchange medium for a predetermined amount of time, and searching for work.

2. The non-transitory computer-readable medium of claim 1, wherein providing a dynamic subset of members includes determining a first member accepting a job is unavailable for more jobs and a second member accepting a job is available for more jobs, wherein the availability of each of the first member and the second member is dependent of a type of the job accepted.

3. The non-transitory computer-readable medium of claim 1, wherein the search criteria is at least one of skills, location, rate and feedback.

4. The non-transitory computer-readable medium of claim 1, further comprising collecting a response from the user, wherein the response becomes part of the collection from which availability is learned.

5. A system for optimizing performance in a services exchange medium, the system comprising:
a first online loop comprising:
a messaging buffer comprising a queue containing messages associated with real-time changes in the system;
a real-time data processing engine comprising a plurality of processors for parallel processing of a message received from the messaging buffer, wherein each of the plurality of processors is configured to process a portion of the message in parallel with a remaining number of the plurality of processors processing other portions of the message such that an entire message is processed for storage in a data warehouse;
a data warehouse storing data processed by the real-time data processing engine;
a matching engine comprising a dynamic match model, the matching engine configured for executing steps comprising:
determining circumstances in which a member is available or unavailable for a job, thereby improving learned availability knowledge using the stored data;
receiving a search criteria specified by a user;
forming a dynamic subset of members based on the availability knowledge;
running the match model to intelligently provide the user with at least one available member selected from the dynamic subset of members, wherein the at least one available member selected from the dynamic subset of members satisfies the search criteria specified by the user;
automatically updating the match model to reflect changes in the stored data, the stored data including user responses; and
a user interface displaying results, wherein the results includes the at least one available member, wherein implicit and explicit user actions associated with the user interface are continuously received by the messaging buffer for further processing by the real-time data processing engine and, thereafter, are stored in the data warehouse to be considered in real-time by the matching engine each time availability of each member is determined to thereby provide more relevant results based on the continuously received explicit and implicit user behaviors, wherein the user behaviors include accepting a job, declining a plurality of invitations, not responding to proposals, not logging into the services exchange medium for a predetermined amount of time, and searching for work.

6. The system of claim 5, wherein the message are received at the messaging buffer from at least one of databases, logs, processes and the user interface.

7. The system of claim 5, wherein the user interface is in a form of one of a web page, an email, a popup message and a device application.

8. The system of claim 5, further comprising an additional online loop, wherein the additional online loop comprises:
the messaging buffer;
the real-time data processing engine;
the data warehouse;
a personalized web search engine implementing a search model configured to intelligently return web search results that are based on the user's behavior within a services exchange medium; and
the user interface, wherein the results includes the web search results.

9. The system of claim 8, wherein the messages in the messaging buffer are messages associated with real-time changes in the system, wherein the messaging buffer is coupled with a plurality of sources including the user interface, wherein implicit and explicit user actions associated with the user interface are received in real-time by the message buffer.

10. The system of claim 5, further comprising a trends/my stats engine configured to personalize the user interface.

11. The system of claim 5, further comprising a real-time data visualization and alerts engine configured to provide information regarding data flow through the system.

12. The system of claim 5, further comprising a notifications/payments engine configured to provide the user with information regarding changes to the system.

13. The system of claim 5, further comprising:
HDFS/Hive storing the same data processed by the real-time data processing engine that is also in the data warehouse, wherein the data in the HDFS/Hive is training data;
an experiment engine including one or more test models; and
a batch data processing engine processing the one or more test models using the training data.

14. The system of claim 13, wherein the one or more test models are refined prior to being implemented by one or more engines of the system.

15. The system of claim 13, wherein the match model was processed by the batch data processing engine prior to the match engine implementing the match model.

16. The system of claim 13, wherein the experiment engine tracks performance of any of the one or more test models and provides performance data of that test model.

17. The system of claim 5, wherein results from the processing by the real-time data processing engine of the user actions associated with the user interface are used to update the dynamic subset of members.

18. A non-transitory computer-readable medium storing instructions that, when executed by a computing device, cause the computing device to perform a method of optimizing performance in a services exchange medium, the method comprising:
continuously updating an evolving collection of data received in real-time, wherein the evolving collection of data includes implicit and explicit user behaviors of all members in at least one user interface associated within the services exchange medium;
processing messages in an online loop that includes a real-time data processing engine, the real-time processing engine comprising a plurality of processors and a matching engine, each of the plurality of processors for parallel processing a portion of a message received from a messaging buffer, the messaging buffer comprising a queue containing messages associated with real-time changes in the services exchange medium;
running a match model matching users posting jobs with members available for jobs, wherein the match model improves learned availability knowledge using the evolving collection of data, to determine circumstances in which a member is available or unavailable for a job;
running the match model comprising:
determining, according to the availability knowledge, availability of each member within the services exchange medium based on the processed data, wherein an availability of a member is updated based on a behavior of the member related to one or more prior jobs;
forming a dynamic subset of members, wherein the dynamic subset includes available members selected from all members of the services exchange medium based on the determining step;
after forming the dynamic subset of members, receiving search criteria input by a user;
using the search criteria as filters to search against a set containing the dynamic subset of members and excluding unavailable members of the services exchange medium to determine at least one of the available members from the dynamic subset of members who satisfies the search criteria, and to present to the user the at least one of the available members, wherein the at least one of the available members from the dynamic subset of members is more likely than not to be both qualified and available;
automatically updating the match model to reflect the changes in the collection of data, wherein updating the match model comprises:
determining a first set of circumstances in which a member is available or unavailable for a job;
using the user behaviors to determine a second set of circumstances in which a member is available or unavailable for a job, the second set of circumstances different from the first set of circumstances;
updating the first set of circumstances to include the second set of circumstances; and
updating the match model based on the first set of circumstances; and
continuously capturing new explicit and implicit user behaviors with the at least one user interface associated with the services exchange medium, to be processed; and
updating the evolving collection of data with the new explicit and implicit user behaviors such that the new explicit and implicit user behaviors are considered in real-time each time availability of each member is determined to provide more relevant results based on the continuously captured explicit and implicit user behaviors, wherein the user behaviors include accepting a job, declining a plurality of invitations, not responding to proposals, not logging into the services exchange medium for a predetermined amount of time, and searching for work.

19. The non-transitory computer-readable medium of claim 18, wherein the evolving collection of data also includes data changes in databases, logs and processes associated with the services exchange medium.

* * * * *